United States Patent
Matsuda (10) Patent No.: US 9,510,578 B2
(45) Date of Patent: Dec. 6, 2016

(54) FISHING SPINNING REEL

(71) Applicant: Globeride, Inc., Tokyo (JP)

(72) Inventor: Kazuyuki Matsuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 15/065,067

(22) Filed: Mar. 9, 2016

(65) Prior Publication Data

US 2016/0316733 A1    Nov. 3, 2016

(30) Foreign Application Priority Data

Apr. 28, 2015    (JP) ................... 2015-091247

(51) Int. Cl.
*A01K 89/01* (2006.01)

(52) U.S. Cl.
CPC ..... *A01K 89/01931* (2015.05); *A01K 89/0193* (2015.05)

(58) Field of Classification Search
CPC ............. A01K 89/01; A01K 89/0111; A01K 89/011223
See application file for complete search history.

(56) References Cited

U.S. PATENT DOCUMENTS

| | | | | |
|---|---|---|---|---|
| 5,788,173 | A * | 8/1998 | Kawabe | A01K 89/01 242/311 |
| 5,934,589 | A | 8/1999 | Young | |
| 6,457,662 | B1 * | 10/2002 | Sato | A01K 89/01 242/247 |
| 2001/0002684 | A1 * | 6/2001 | Hitomi | A01K 89/0111 242/322 |
| 2003/0205637 | A1 * | 11/2003 | Nakajima | A01K 89/006 242/283 |
| 2004/0251363 | A1 * | 12/2004 | Sugawara | A01K 89/0111 242/322 |
| 2006/0266861 | A1 | 11/2006 | Kitajima et al. | |
| 2008/0149750 | A1 * | 6/2008 | Kitajima | A01K 89/01 242/224 |
| 2009/0166460 | A1 * | 7/2009 | Kitajima | A01K 89/0111 242/322 |
| 2011/0042500 | A1 * | 2/2011 | Saito | A01K 89/01 242/224 |
| 2012/0097779 | A1 * | 4/2012 | Inoue | A01K 89/01 242/249 |
| 2013/0206889 | A1 * | 8/2013 | Ochiai | A01K 89/00 242/322 |
| 2013/0327870 | A1 * | 12/2013 | Hiraoka | A01K 89/01 242/234 |
| 2014/0175206 | A1 * | 6/2014 | Hiraoka | A01K 89/0111 242/234 |
| 2014/0346266 | A1 * | 11/2014 | Matsuo | A01K 89/01 242/234 |

FOREIGN PATENT DOCUMENTS

| | | |
|---|---|---|
| EP | 2923568 | 9/2015 |
| JP | 6-11469 | 2/1994 |
| JP | 2006-333705 | 12/2006 |

OTHER PUBLICATIONS

Extended European Search Report dated Sep. 26, 2016 for Application No. 16159956.8.

* cited by examiner

*Primary Examiner* — Emmanuel M Marcelo
(74) *Attorney, Agent, or Firm* — Pillsbury Winthrop Shaw Pittman, LLP (57) ABSTRACT

A fishing spinning reel according to the disclosure includes a drive shaft sleeve rotatably supported by a reel body, a spool shaft that reciprocates back and forth, an cylindrical aligning holder attached on a front end portion of the drive shaft sleeve, and a bearing that is fitted on an inner peripheral surface of the aligning holder and supports the spool shaft slidably in a front-rear direction. The aligning holder includes a bearing fitted portion that is situated in front of the front end portion of the drive shaft sleeve and has the inner peripheral surface on which the bearing is fitted, and a concentric fitting portion fitted into the front end portion of the drive shaft sleeve to obtain a high concentricity of the bearing with the drive shaft sleeve.

2 Claims, 7 Drawing Sheets

FISHING SPINNING REEL

CROSS-REFERENCE TO RELATED APPLICATIONS

This application is based on and claims the benefit of priority from Japanese Patent Application Serial No. 2015-91247 (filed on Apr. 28, 2015), the contents of which are hereby incorporated by reference in their entirety.

TECHNICAL FIELD

The present invention relates to a fishing spinning reel.

BACKGROUND

Fishing spinning reels include a spool for winding a fishing-line thereon. The spool may be attached on a front side of a spool shaft that reciprocates in a front-rear direction by a handle operation. In this manner, the fishing line is evenly wound on the spool.

The spool shaft may be inserted in a drive shaft sleeve that transmits a drive force generated by a handle operation to a rotor. When a large load is worked on the spool and the spool shaft is bent, a contact pressure between an outer peripheral surface of the spool shaft and an inner peripheral surface of the drive shaft sleeve is increased, and consequently a sliding resistance on the spool shaft is increased, which may degrade smoothness of the rotational operation of the handle.

In order to avoid such a situation, Japanese Utility Model Application Publication No. Hei 6-11469 (the "'469 Publication") disclosed rolling members interposed between the inner peripheral surface of the drive shaft sleeve and the outer peripheral surface of the spool shaft to support the spool shaft such that the spool shaft can be guided and rolled in the front-rear direction.

Japanese Patent Application Publication No. 2006-333705 (the "'705 Publication") disclosed a bearing fitted in an inner peripheral surface of a rotor nut screwed on the drive shaft sleeve. The spool shaft is supported by the bearing such that the spool shaft is slidable in the front-rear direction.

SUMMARY

However, the feature disclosed in the '469 Publication requires a high strength and durability of the drive shaft sleeve and the spool shaft since the rolling members contact the inner peripheral surface of the drive shaft sleeve and the outer peripheral surface of the spool shaft. This requirement limits the applicable materials for the drive shaft sleeve and the spool shaft and the degree of freedom of design.

Meanwhile, it is difficult to achieve a high concentricity of the bearing disclosed in the '705 Publication with the drive shaft sleeve because the bearing is supported by the rotor nut screwed on the drive shaft sleeve. For this reason, a sliding resistance on the spool shaft that slides in the front-rear direction within the bearing is increased and this may impair the accuracy of the reciprocation of the spool in the front-rear direction.

In view of the above problems, the disclosure provides a fishing spinning reel in which a degree of design freedom is increased and a high concentricity of the bearing with the drive shaft sleeve can be obtained to decrease the sliding resistance of the spool shaft.

A fishing spinning reel 1 according to the disclosure includes a cylindrical drive shaft sleeve that is rotatably supported by a reel body and extends in a front-rear direction, a spool shaft that is inserted in the drive shaft sleeve and reciprocates back and forth, a cylindrical aligning holder attached on a front end portion of the drive shaft sleeve, and a bearing that is fitted on an inner peripheral surface of the aligning holder and supports the spool shaft slidably in the front-rear direction. The aligning holder includes a bearing fitted portion situated in front of the front end portion of the drive shaft sleeve and having the inner peripheral surface on which the bearing is fitted, and a concentric fitting portion fitted into the front end portion of the drive shaft sleeve to obtain a high concentricity of the bearing with the drive shaft sleeve.

According to the above-described embodiment, the rolling members in the prior art are not used so that there is no material limitation for the drive shaft sleeve and the spool shaft. Consequently, a degree of design freedom is increased.

Moreover, according to the above-described embodiment, the aligning holder and the drive shaft sleeve form a single body such that the concentric fitting portion is fitted in the front end portion of the drive shaft sleeve. More specifically, the aligning holder according to the embodiment is not screwed to the drive shaft sleeve unlike a conventional rotor nut, so that it is not difficult to achieve a high concentricity of the bearing with the drive shaft sleeve. In this manner, a high concentricity of the bearing with the drive shaft sleeve can be obtained and a sliding resistance of the spool shaft can be decreased.

Moreover, as for the aligning holder according to the embodiment, there are no particular limitations on the design of the inner diameter of the bearing fitted portion. More specifically, it is possible to select the bearing that has a sufficient strength against the sliding resistance of the spool shaft, and to set the inner diameter of the bearing fitted portion such that the inner periphery of the bearing fitted portion can house the bearing. Therefore, a designer is not forced to select a bearing that has a low strength or a particular bearing.

In the above-described embodiment, it is preferable that the concentric fitting portion be fitted on an outer periphery of the front end portion of the drive shaft sleeve, and an inner peripheral surface of the concentric fitting portion and the inner peripheral surface of the bearing fitted portion be made concentric with each other.

Alternatively, it is preferable that the concentric fitting portion be fitted on an inner periphery of the front end portion of the drive shaft sleeve, and an outer peripheral surface of the concentric fitting portion and the inner peripheral surface of the bearing fitted portion be made concentric with each other.

In this case, only two surfaces among the outer peripheral surfaces of the aligning holder (an inner peripheral surface of the bearing fitted portion and an inner peripheral surface of the concentric fitting portion, or an inner peripheral surface of the bearing fitted portion and an outer peripheral surface of the concentric fitting portion) need to be concentric but the entire aligning holder is not necessarily formed concentric. Therefore the fabrication is made easier and the manufacturing cost can be reduced.

A fishing spinning reel according to the disclosure includes a cylindrical drive shaft sleeve rotatably supported by a reel body and extending in a front-rear direction, a spool shaft that is inserted in the drive shaft sleeve and reciprocates back and forth, a rotor nut screwed in an front end portion of the drive shaft sleeve, a bearing that is fitted on an inner peripheral surface of the rotor nut and supports the spool shaft slidably in a front-rear direction, and an cylindrical aligning holder attached on a front end portion of the drive shaft sleeve. The aligning holder is fitted in the front end portion of the drive shaft sleeve and fitted on the inner peripheral surface of the rotor nut, and a joint surface of the aligning holder fitted in the front end portion of the drive shaft sleeve and an outer peripheral surface of the aligning holder fitted on the inner peripheral surface of the rotor nut are made concentric with each other.

According to the above-described invention, the rolling members in the prior art are not used so that there is no material limitation for the drive shaft sleeve and the spool shaft are not limited. Consequently, a degree of design freedom is increased.

In the above-described embodiment, the inner peripheral surface of the rotor nut that abuts the outer peripheral surface of the aligning holder is adjusted to be concentric with the spool shaft. As a result, the bearing fitted on the inner peripheral surface of the rotor nut is also arranged concentric with the drive shaft sleeve. Consequently a sliding resistance of the spool shaft is reduced.

Moreover, in the above-described embodiment, there is no limitation on the design of the inner peripheral surface of the rotor nut. More specifically, it is possible to select the bearing that has a sufficient strength against the sliding resistance of the spool shaft, and to set the inner diameter of the rotor nut such that the inner periphery of the rotor nut can house the bearing. Therefore, a designer is not forced to select a bearing 31 that has a low strength or a particular bearing.

According to the above-described aspects of the disclosure, it is possible to provide a fishing spinning reel in which a degree of design freedom is increased and a high concentricity of a bearing with a drive shaft sleeve can be obtained to decrease a sliding resistance of the spool shaft.

Moreover, according to the above-described aspects of the disclosure, it is possible to select an adequate bearing and provide an inexpensive and highly-durable fishing spinning reel.

DESCRIPTION OF THE PREFERRED EMBODIMENTS

A fishing spinning reel according to one embodiment will be hereunder described with reference to the accompanying drawings. In the following description, the directions referred to as a "front-rear direction" and an "upper-lower direction" are based on those shown in FIG. 1.

Figure 1:
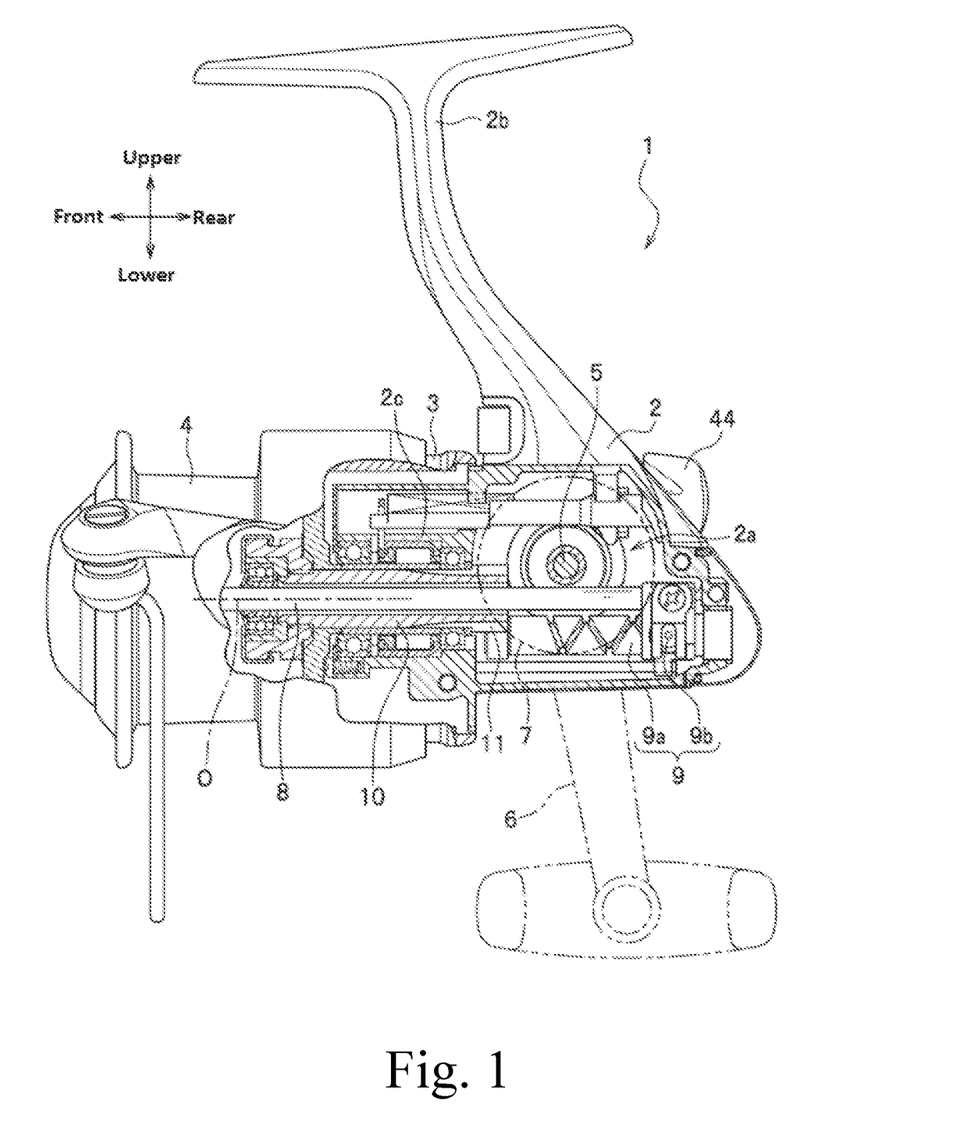
FIG. 1 schematically illustrates a fishing spinning reel according to a first embodiment.

Referring to FIG. 1, a fishing spinning reel 1 may include a reel body 2 having a spoof shaft 8 that extends out toward the front direction, a rotor 3 that rotates about a central axis "O" of the spool shaft 8, and a spool 4 that is attached to a front end of the spool shaft 8 and reciprocates back and forth. The central axis O of the spool shaft 8 may be hereunder referred to as simply the "central axis O."

The reel body 2 may have an interior space 2a in which a drive gear 7 and the like may be housed, which will be later described. On the reel body 2, provided are a leg 2b that extends upward to be attached on a fishing rod, and a cylindrical portion 2c that opens toward the front and in which a drive shaft sleeve 10 and the spool shaft 8 are inserted.

The reel body 2 may support a handle shaft 5 rotatably and the handle shaft 5 extends in the left-right direction in the interior space 2a.

The handle shaft 5 may be engaged with a drive gear 7 that meshes with a pinion gear 11 formed at a rear end of the drive shaft sleeve 10 so as to rotate together. In this way, a rotational movement of the handle shaft 5 is transmitted to the drive shaft sleeve 10.

One end of the handle shaft 5 penetrates the reel body 2 to be situated in a side portion of the reel body 2 and a handle 6 is attached thereto.

Figure 2:
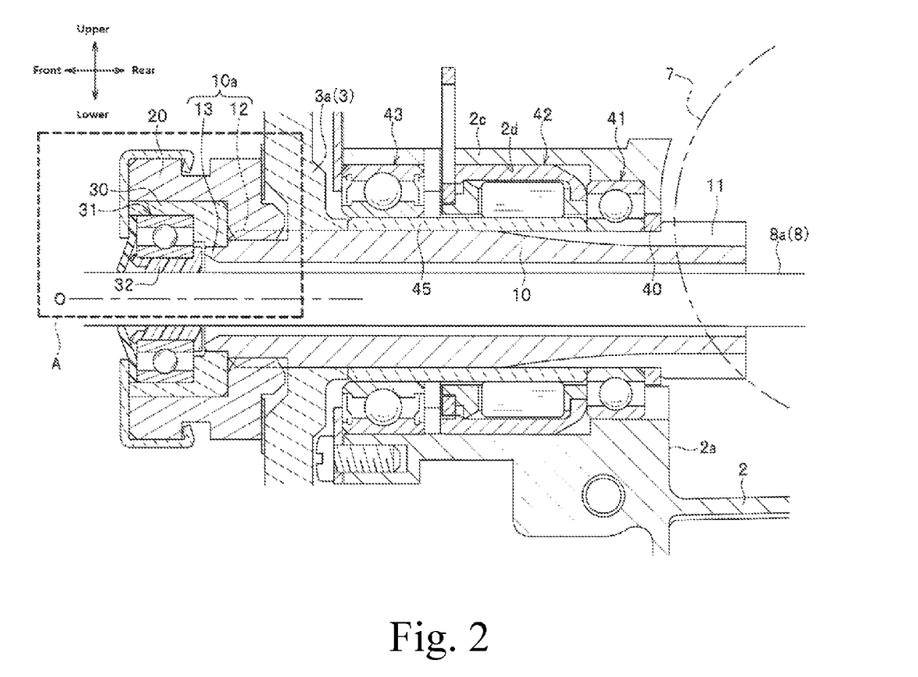
FIG. 2 is an enlarged view of a portion of the fishing spinning reel.

Referring to FIG. 2, the drive shaft sleeve 10 is inserted through a first bearing 41 and a second bearing 43 that are supported and fitted on an inner peripheral surface 2d of the cylindrical portion 2c such that the drive shaft sleeve 10 freely rotates inside the cylindrical portion 2c.

An inner ring 45 that is a component of a later-described anti-reverse mechanism 42 is disposed between the first bearing 41 and the second bearing 43 placed between the drive shaft sleeve 10 and the cylindrical portion 2c.

Here, the inner peripheral surface 2d of the cylindrical portion 2c on which the first bearing 41 and the second bearing 43 are fitted may be formed in a cross-sectionally circular shape as viewed from the front and concentric with the central axis O of the spool shaft 8. Therefore a rotational axis of the drive shaft sleeve 10 corresponds to the central axis O of the spool shaft 8, and the drive shaft sleeve 10 rotates on the central axis O of the spool shaft 8.

An outer ring of a rolling one-way clutch that is a component of the common anti-reverse mechanism 42 is unrotatably fitted on the inner peripheral surface 2d of the cylindrical portion 2c. Therefore, when a knob 44 (see FIG. 1) is operated to be set in an anti-reverse position, reverse rotation of the drive shaft sleeve 10 in which the inner ring 45 is unrotatably fitted is prevented.

A fixing portion 3a of the rotor 3 may be unrotatably fitted on the drive shaft sleeve 10 on a front side portion. When the handle shaft 5 is rotated by the rotational operation of the handle 6, the drive force of the handle is transmitted to the drive shaft sleeve 10 through the drive gear 7 and the pinion gear 11, and the drive shaft sleeve 10 and the rotor 3 rotate on the central axis O.

On the rear side of the drive shaft sleeve 10, a buffer material 40 that prevents the inner ring of the first bearing 41 from contacting the pinion gear 11 may be provided.

A front end portion 10a of the drive shaft sleeve 10 will be later described.

The spool shaft 8 is inserted in the drive shaft sleeve 10. Referring to FIG. 1, a rear end of the spool shaft 8 may extend out from the drive shaft sleeve 10 toward the rear side and be situated in the interior space 2a to be coupled to a common oscillating mechanism 9 provided in the interior space 2a.

The oscillating mechanism 9 may include a worm shaft (a traverse cam shaft) 9a that rotates in mesh with the pinion gear 11 of the drive shaft sleeve 10, and a slider 9b that meshes with grooves in the worm shaft 9a. When the handle shaft 5 is rotated by the rotational operation of the handle 6, the spool shaft 8 reciprocates back and forth via the drive gear 7, the pinion gear 11, the worm shaft 9a, and the slider 9b.

A front end portion 10a of the drive shaft sleeve 10 will be now described.

Referring to FIG. 2, a thread groove 12 (male thread) may be formed on the outer periphery of the front end portion of the drive shaft sleeve 10. Moreover a joint portion 13 may be formed in front of the thread groove 12 in the axial direction. A rotor nut 20 may be screwed in the thread groove 12 an aligning holder 30 may be jointed to the joint portion 13.

On an inner peripheral surface of the aligning holder 30, a collar 32 and a bearing 31 for slidably supporting the spool shaft 8 in the front-rear direction may be provided.

The details of these components will be hereunder described.

Figure 3:
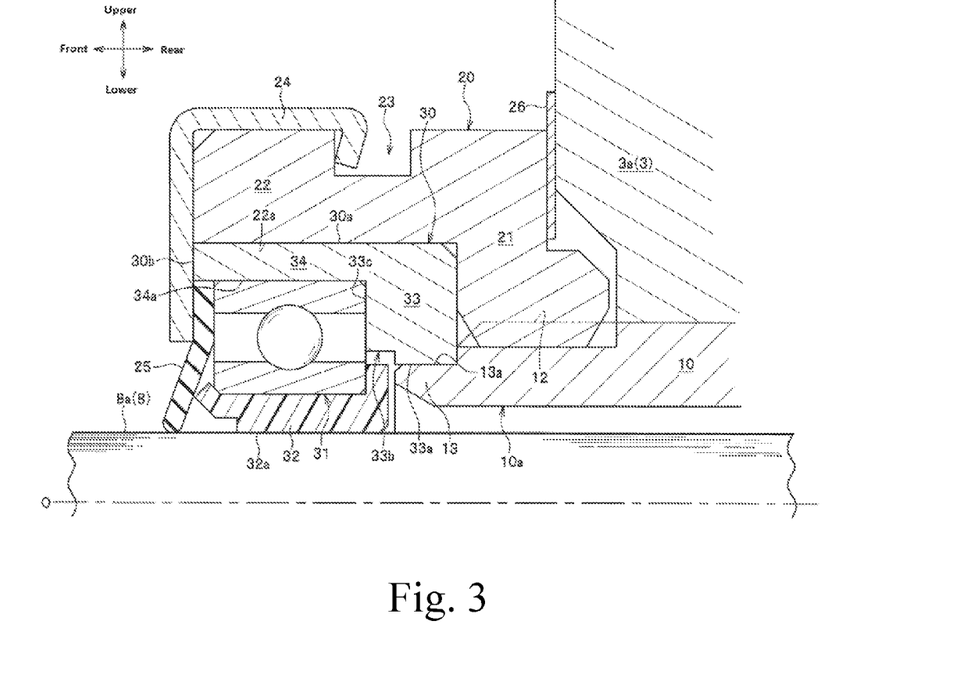
FIG. 3 is an enlarged view of a portion of the reel enclosed by the dashed line A in FIG. 2.

Referring to FIG. 3, the rotor nut 20 may include a clamping portion 21 that is fitted in the thread groove 12 and presses the fixing portion 3a of the rotor 3 toward the rear side through a buffer material 26, and an extending portion 22 that extends toward the front side from the clamping portion 21 along an outer peripheral surface 30a of the aligning holder 30.

Referring again to FIG. 2, the clamping portion 21 clamps the fixing portion 3a of the rotor 3, the inner ring 45 of the anti-reverse mechanism 42, the inner ring of the first bearing 41, and the buffer material 40 between the clamping portion 21 and the pinion gear 11. In this way, the drive shaft 10 is supported by the first bearing 41 and the anti-reverse mechanism 42 without jolting in the front-rear direction.

The extending portion 22 of the rotor nut 20 will be later described.

The bearing 31 is a bearing that supports the spool shaft 8 slidably in the front-rear direction through the collar 32 fitted on the inner side of the bearing 31.

The collar 32 may be a cylindrical member formed of a resin. The inner diameter of the collar 32 may be slightly larger than the outer diameter of the spool shaft 8. Therefore when a central axis of the collar 32 coincides with the central axis O of the spool shaft 8, a small gap (not shown) is made along the entire circumference between an inner peripheral surface 32a of the collar 32 and the outer peripheral surface 8a of the spool shaft 8.

The collar 32 may be made of a metal in the embodiment.

Referring to FIG. 3, the joint portion 13 of the drive shaft sleeve 10 may be formed in a cylindrical shape and its outer diameter may be smaller than the outer diameter of the drive shaft sleeve 10. An outer peripheral surface 13a of the joint portion 13 may be formed in a circular shape as viewed from the front-rear direction and be concentric with the central axis O.

The aligning holder 30 may be a cylindrical member for supporting the bearing 31 and may include a concentric fitting portion 33 that is formed in a cylindrical shape and fitted on the outer periphery of the joint portion 13, and a bearing fitted portion 34 that extends from the concentric fitting portion 33 toward the front side and in which the bearing 31 is fitted on the inner periphery.

A first inner peripheral surface 33a of the concentric fitting portion 33 and a second inner peripheral surface 34a of the bearing fitted portion 34 may be formed in circular shapes as viewed from the front.

A notch 33b may be formed in front of the first inner peripheral surface 33a in order to prevent the aligning holder 30 from touching the inner ring of the bearing 31 and the collar 32.

The first inner peripheral surface 33a and the second inner peripheral surface 34a may be concentric with each other. Therefore the central axis of the bearing 31 (the central axis of the collar 32) fitted on the second inner peripheral surface 34a coincides with the central axis of the joint portion 13 on which the first inner peripheral surface 33a is fitted and the central axis O of the spool shaft 8. As a result, a small gap (not shown) is made along the entire circumference between the inner peripheral surface 32a of the collar 32 and the outer peripheral surface 8a of the spool shaft 8, and a sliding resistance of the spool shaft 8 that slides inside the collar 32 in the front-rear direction is made very small.

Moreover, a front end surface 33c of the concentric fitting portion 33 abuts the outer ring of the bearing 31 fitted on the second inner peripheral surface 34a so that the aligning holder 30 can stably support the bearing 31.

The extending portion 22 of the rotor nut 20 may be situated on the outer periphery of the aligning holder 30.

An inner peripheral surface 22a of the extending portion 22 may be formed to abut the outer peripheral surface 30a of the aligning holder 30. Therefore, when a load acts on the spool 4 to bend the spool shaft 8, in other words, when a load acts on the aligning holder 30 through the bearing 31, the extending portion 22 of the rotor nut 20 supports the aligning holder 30 and can prevent deformation of the aligning holder 30.

A groove 23 is formed on the outer peripheral surface of the extending portion 22 of the rotor nut 20. A retainer 24 that abuts a front end surface 30b of the aligning holder 30 is engaged in the groove 23. In this way, the aligning holder 30 is prevented from falling off from the joint portion 13.

A disk-shaped sealing member 25 made of rubber is provided between the retainer 24 and the outer ring of the bearing 31. The sealing member 25 abuts the outer peripheral surface of the spool shaft 8, which prevents foreign substances from entering into the bearing 31 and between the collar 32 and the spool shaft 8.

According to the first embodiment described above, a high concentricity of the bearing 31 (the collar 32) with the drive shaft 10 can be definitely obtained and the spool 4 attached on the spool shaft 8 can smoothly and accurately move in the front-rear direction.

Moreover, according to the first embodiment, the rolling members described as the prior art above are not used so that materials for the drive shaft sleeve 10 and the spool shaft 8 are not limited and a degree of design freedom is increased.

Furthermore, according to the first embodiment, the inner diameter of the bearing fitted portion 34 is set in accordance with the size of the bearing 31 so that it is possible to select the bearing 31 that has a sufficient strength against the sliding resistance of the spool shaft 8. Therefore, a designer is not forced to select the bearing 31 that has a low strength or a particular bearing 31 in order to adapt to the inner diameter of the bearing fitted portion 34.

In addition, according to the first embodiment, as for the periphery of the aligning holder 30, only the first inner peripheral surface 33a of the concentric fitting portion 33 and the second inner peripheral surface 34a of the bearing fitted portion 34 need to be concentric and the entire aligning holder 30 is not necessarily formed concentric. Therefore the fabrication is made easier and the manufacturing cost can be reduced.

Figure 4:
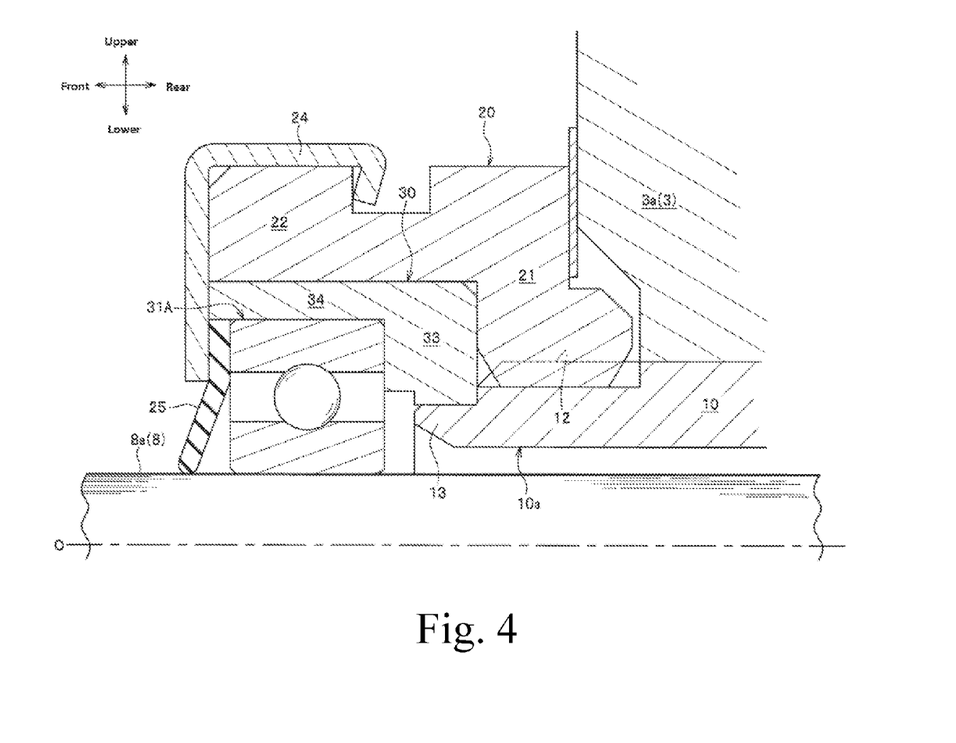
FIG. 4 schematically illustrates a fishing spinning reel according to a first modification example.

The first embodiment has been described. Alternatively the spool shaft 8 may be supported slidably in the front-rear direction by the bearing 31A without the collar 32 interposed therebetween as illustrated in FIG. 4.

The entire outer peripheral surface 13a and the entire first inner peripheral surface 33a fitted thereon are formed in a circular shape as viewed in section in the first embodiment. Alternatively threads may be formed on a portion of the outer peripheral surface 13a and the first inner peripheral surface 33a by a milling machine, and the outer peripheral surface 13a can be unrotatably fitted on the first inner peripheral surface 33a.

The inner peripheral surface 22a of the extending portion 22 of the rotor nut 20 may be formed to abut the outer peripheral surface 30a of the aligning holder 30. Alternatively a gap may be formed between the inner peripheral surface 22a and the outer peripheral surface 30a.

Even in this case the bearing 31 is also supported by the aligning holder 30 so that the spool 4 attached on the spool shaft 8 can move accurately and smoothly in the front-rear direction. In other words, a high precision is not required for the outer diameter of the aligning holder 30 and the inner diameter of the extending portion 22 of the rotor nut 20 in the invention.

Moreover, the concentric fitting portion 33 of the aligning holder 30 is configured to be fitted on the outer peripheral surface 13a of the joint portion 13 of the drive shaft sleeve 10 in the first embodiment. Alternatively, referring to FIG. 5, the concentric fitting portion 33A of an aligning holder 30A may be fitted on an inner peripheral surface 13b of a joint portion 13A of the drive shaft sleeve 10.

Figure 5:
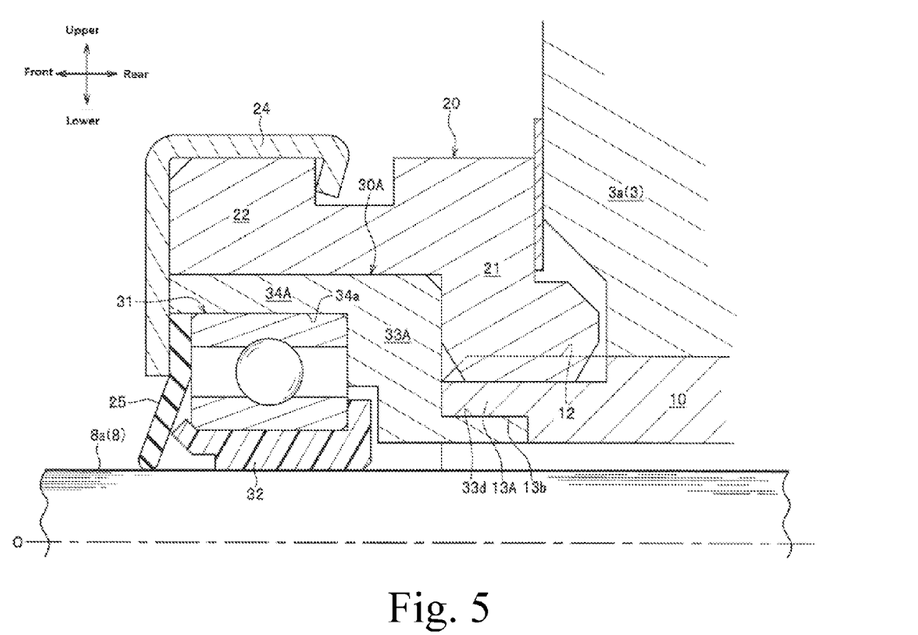
FIG. 5 schematically illustrates a fishing spinning reel according to a second modification example.

When the aligning holder 30A according to such a modification example is used the central axis O of the spool shaft 8 can be made coincide with the central axis of the collar 32 by making the second inner peripheral surface 34a of a bearing fitted portion 34A and an outer peripheral surface 33d of the concentric fitting portion 33A concentric.

As a means to prevent the aligning holder 30 from falling off the joint portion 13 of the drive shaft sleeve 10, the extending portion 22 is provided on the rotor nut 20 and the retainer 24 that engages in the groove 23 in the extending portion 22 is further provided in the first embodiment. However, the invention is not limited to this.

Figure 6:
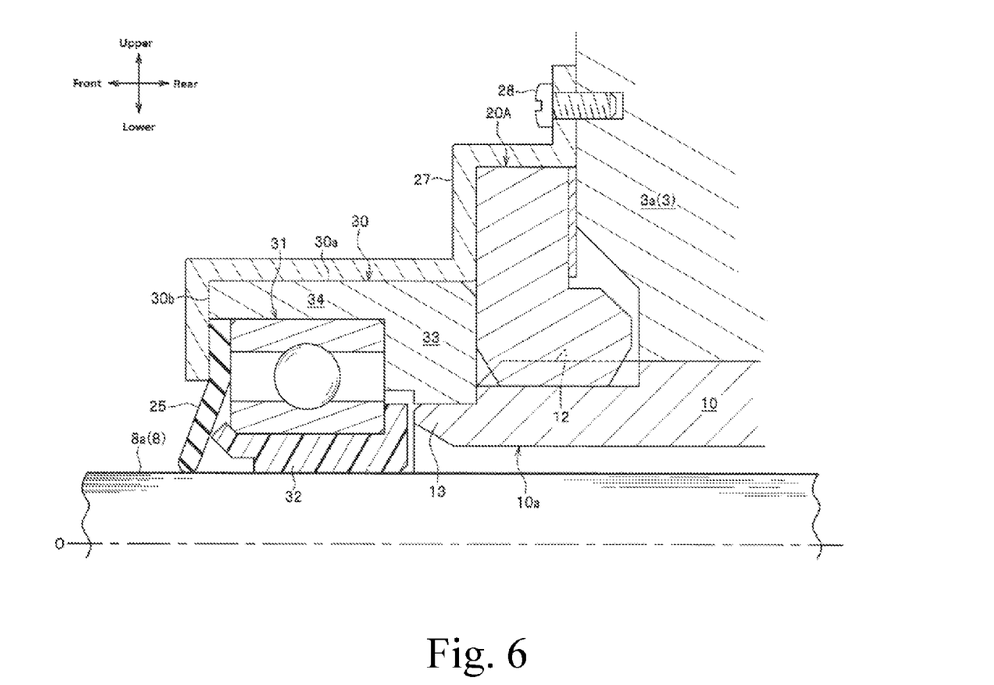
FIG. 6 schematically illustrates a fishing spinning reel according to a third modification example.

For instance, referring to FIG. 6, falling off of the aligning holder 30 may be prevented by a cover 27 fixed on the fixing portion 3a of the rotor 3 with a screw 28.

A second embodiment will be now described in detail with reference to FIG. 7.

Figure 7:
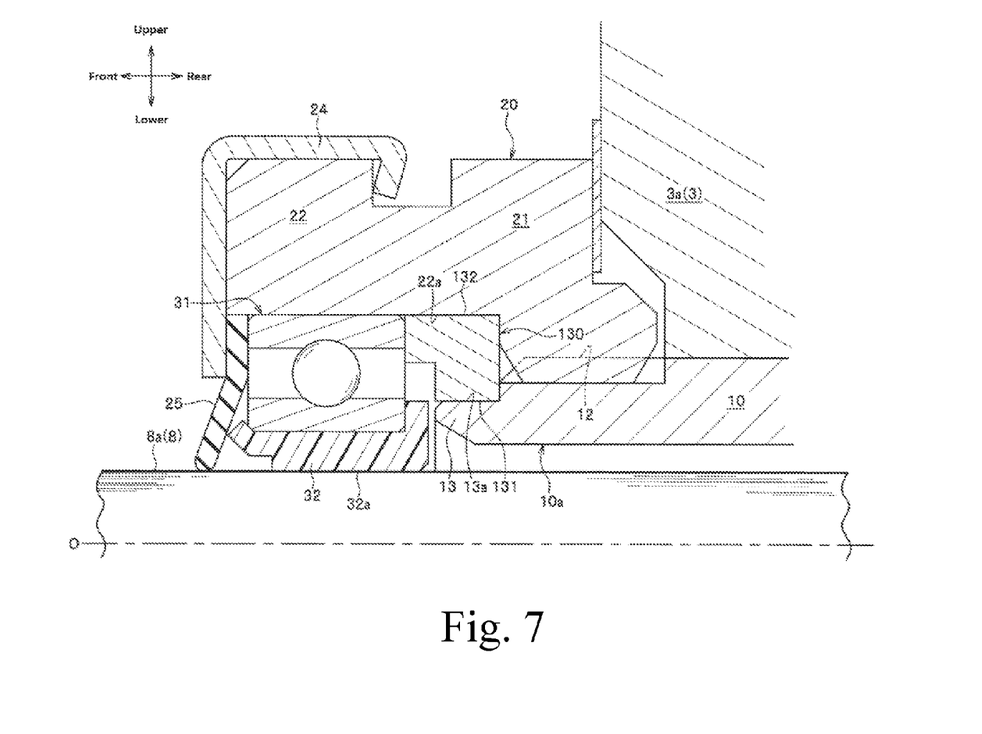
FIG. 7 is an enlarged view of a front portion side of the spool shaft according to a second embodiment.

Referring to FIG. 7, an aligning holder 130 according to the second embodiment may be configured to obtain the concentricity of the drive shaft sleeve 10 with the bearing 31 in an indirect manner by making the rotor nut 20 in which the bearing 31 is fitted concentric with the drive shaft sleeve 10.

More specifically, the bearing 31 that supports the spool shaft 8 slidably in the front-rear direction may be fitted on the inner peripheral surface of the rotor nut 20 (the inner peripheral surface 22a of the extending portion 22). The aligning holder 130 according to the second embodiment may be fitted between the front end portion 10a (the joint portion 13) of the drive shaft sleeve 10 and the inner peripheral surface 22a of the rotor nut 20.

The aligning holder 130 has an inner peripheral surface (a joint surface) 131 and an outer peripheral surface 132 that are concentric with each other. Therefore the inner peripheral surface 22a of the rotor nut 20 that abuts the outer peripheral surface 132 of the aligning holder 130 is aligned concentric with the outer peripheral surface 13a of the joint portion 13 of the drive shaft sleeve 10 that abuts the inner peripheral surface 131 of the aligning holder 130. Consequently, the central axis of the bearing 31 (the central axis of the collar 32) that is fitted on the inner peripheral surface 22a of the rotor nut 20 coincides with the central axis O of the spool shaft 8.

As described above, in the second embodiment, a small gap (not shown) is also made along the entire circumference between the inner peripheral surface 32a of the collar 32 and the outer peripheral surface 8a of the spool shaft 8, and a sliding resistance of the spool shaft that slides inside the collar 32 in the front-rear direction is made very small.

According to the second embodiment described above, a high concentricity of the bearing 31 (the collar 32) with the drive shaft 10 can be definitely obtained and the spool 4 attached on the spool shaft 8 can smoothly and accurately move in the front-rear direction.

Moreover, since the rolling members described in the prior art are not used in the second embodiment, so that a degree of design freedom is increased.

Moreover, according to the second embodiment, there is no limit on the design of the inner peripheral surface 22a of the rotor nut 20. Therefore it is possible to select the bearing 31 that has a sufficient strength against the sliding resistance of the spool shaft 8 and to set a diameter of the rotor nut 20 at the inner peripheral surface 22a so as to fit the bearing 31 thereon. Consequently, a designer is not forced to select the bearing 31 that has a low strength or a particular bearing 31 in order to adapt to the inner peripheral surface 22a of the rotor nut 20. Moreover a high precision is not required for the rotor nut 20 and the thread portion of the drive shaft sleeve 10.

The second embodiment has been described. Alternatively the aligning holder 130 may be fitted on the inner peripheral surface 13b of the drive shaft sleeve 10 as illustrated in FIG. 5. More specifically, the outer peripheral surface (the joint surface) fitted on the inner peripheral surface 13b of the drive shaft sleeve 10 and the outer peripheral surface fitted on the inner peripheral surface of the rotor nut may be made concentric in order to obtain a high concentricity of the drive shaft sleeve 10 with the bearing 31 (the collar 32).

What is claimed is:

1. A fishing spinning reel comprising:
a cylindrical drive shaft sleeve rotatably supported by a reel body and extending in a front-rear direction;
a spool shaft inserted in the drive shaft sleeve and reciprocating back and forth;
a cylindrical aligning holder attached on a front end portion of the drive shaft sleeve; and
a bearing fitted on an inner peripheral surface of the aligning holder and supporting the spool shaft slidably in the front-rear direction,
wherein the aligning holder includes:
a bearing fitted portion situated in front of the front end portion of the drive shaft sleeve and having the inner peripheral surface on which the bearing is fitted; and
a concentric fitting portion fitted into the front end portion of the drive shaft sleeve to obtain a high concentricity of the bearing with the drive shaft sleeve, and wherein the concentric fitting portion is fitted on an inner periphery of the front end portion of the drive shaft sleeve, and an outer peripheral surface of the concentric fitting portion and an inner peripheral surface of the bearing fitted portion are made concentric with each other.

2. A fishing spinning reel comprising:

a cylindrical drive shaft sleeve rotatably supported by a reel body and extending in a front-rear direction;

a spool shaft inserted in the drive shaft sleeve and reciprocating back and forth;

a rotor nut screwed in a front end portion of the drive shaft sleeve;

a bearing fitted on an inner peripheral surface of the rotor nut and supporting the spool shaft slidably in a front-rear direction; and a cylindrical aligning holder attached on a front end portion of the drive shaft sleeve, wherein the aligning holder is fitted in the front end portion of the drive shaft sleeve and fitted on the inner peripheral surface of the rotor nut, and a joint surface of the aligning holder fitted in the front end portion of the drive shaft sleeve and an outer peripheral surface of the aligning holder fitted on the inner peripheral surface of the rotor nut are made concentric with each other.

* * * * *